United States Patent [19]
Katsuragi et al.

[11] Patent Number: 5,178,485
[45] Date of Patent: * Jan. 12, 1993

[54] HEAT EXCHANGING PIPE SYSTEM FOR UNIFORMLY HEATING ROAD SURFACES AND THE LIKE

[75] Inventors: Kohei Katsuragi; Takayuki Hiyama, both of Yamagata, Japan

[73] Assignee: Nihon Chikasui Kaihatsu Kabushiki Kaisha, Yamagata, Japan

[*] Notice: The portion of the term of this patent subsequent to Nov. 5, 2008 has been disclaimed.

[21] Appl. No.: 687,960

[22] Filed: Apr. 19, 1991

Related U.S. Application Data

[63] Continuation-in-part of Ser. No. 368,409, Jun. 19, 1989, Pat. No. 5,026,736.

[30] Foreign Application Priority Data

Aug. 8, 1988 [JP] Japan .................. 63-197688

[51] Int. Cl.$^5$ .................. F24J 3/08; F28D 7/12
[52] U.S. Cl. .................. 404/95; 165/45; 405/234
[58] Field of Search .................. 404/61, 71, 72, 79, 404/95; 405/131, 234; 126/343.5 R; 165/45

[56] References Cited

U.S. PATENT DOCUMENTS

| | | | |
|---|---|---|---|
| 1,581,088 | 4/1926 | Pearce | 405/131 |
| 2,631,531 | 5/1953 | Davidson | 165/45 |
| 3,195,619 | 7/1965 | Tippmann | 405/234 X |
| 3,236,991 | 2/1966 | Graham et al. | 404/41 X |
| 3,521,699 | 7/1970 | Van Huisen | 165/45 X |
| 4,139,321 | 2/1979 | Werner | 405/154 |
| 4,452,303 | 6/1984 | Bontje et al. | 165/142 |
| 4,693,300 | 9/1987 | Adachi | 165/1 |

*Primary Examiner*—William P. Neuder
*Attorney, Agent, or Firm*—Ladas & Parry

[57] ABSTRACT

For uniformly heating a snow collecting surface on an outdoor structure, e.g., a roadway, a heat exchanging pipe system is embedded in the structure near the surface. The pipe system comprises two sets of parallel, and preferably, interdigitated sets of pipes, and means for pumping heated water in one direction through one of the sets of pipes and for pumping water in the opposite direction through the other set of pipes. Preferably, underground water is used; one well being used from which the underground water is pumped, and another well being into which the water discharged from the heat exchanger is pumped for eventual reheating of the discharged water.

2 Claims, 4 Drawing Sheets

HEAT EXCHANGING PIPE SYSTEM FOR UNIFORMLY HEATING ROAD SURFACES AND THE LIKE

This is a continuation-in-part application of copending application Ser. No. 07/368,409 filed on Jun. 19, 1989, now U.S. Pat. No. 5,026,736.

BACKGROUND OF THE INVENTION

This invention relates to a heat exchanging pipe system, a preferred use therefor being the melting of snow on roadways or other outdoor structures.

Recently, a method of melting and removing snow which has fallen on roads or building structures comprises embedding a heat exchanging pipe system within a structure near the snow receiving surface thereof and pumping heated water through the pipe system to melt the snow. In a preferred application, underground water is pumped up from one well, passed through the pipe system, and pumped into an adjacent well where the cooled water is eventually reheated.

In known heat exchanging pipe system, the water flows in a single direction from one end of the heat exchanger to the other.

A problem with this is that the water near the water outlet end of the heat exchanger is cooler than the incoming water, and the snow melting capacity of the heat exchanger is considerably less near its water outlet end than at its water inlet end. Under various circumstances, e.g., an exceptionally heavy snow fall, the snow overlying the water inlet end of the heat exchanger is properly melted while the snow overlying the water outlet end is not properly melted. This, of course, is undesirable as not fully fulfilling the purpose of the heat exchanger.

SUMMARY OF THE INVENTION

To overcome the aforedescribed problem of non-uniform heating from end to end of the heat exchanger, a heat exchanging pipe system is provided comprising two parallel and preferably interdigitated sets of pipes, the pipes preferably being embedded beneath the surface of a structure, e.g., a roadway, from which snow is to be melted. Each set of pipes is connected to an inlet header, into which heated water is pumped for passing through the pipes, and an outlet header, into which water from the pipes is discharged for discharge from the heat exchanger. To provide a uniform heating effect from end to end of the exchanger, the water inlet header of one set of pipes is disposed at a first end of the heat exchanger, with the water outlet header of the one set being disposed at the other or second end of the heat exchanger, and the headers of the other set of pipes are oppositely disposed to the headers of the one set. That is, the water inlet header of the other set of pipes is disposed at the second end of the heat exchanger and the water outlet header of the other set of pipes is disposed at the first end of the heat exchanger. As a result of this arrangement, heated water passes through the heat exchanger in opposite directions and, with respect to the overall heat exchanger, there is little temperature variation over its entire length.

DESCRIPTION OF THE PREFERRED EMBODIMENTS

Snow melting using the pipe system of this invention is preferably carried out in consideration of the heat retaining function of an underground aquifer. The heat retaining function of the aquifer will be described hereunder. For example, when warm water having a temperature of about 28° C. is fed into the aquifer generally with a void ratio of about 30%, rocks, gravels, sands and the like in the aquifer are warmed to thereby form a warm water zone. The warm water zone is gradually developed into a wide range zone, thus retaining heat energy in the aquifer due to the heat retaining function of the aquifer. Conversely, when cold water is fed into the aquifer, a cold water zone is formed there.

Figure 1:
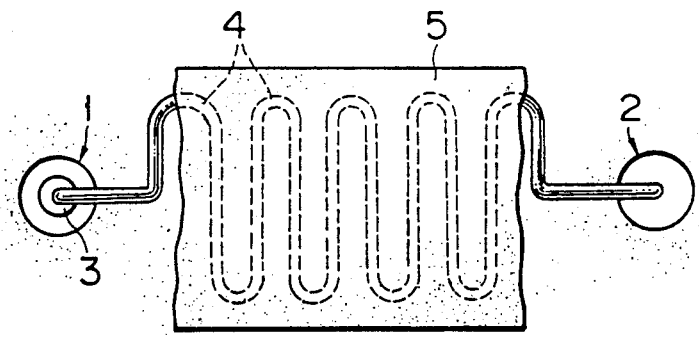
FIG. 1 is a schematic plan view explanatory of a heat exchanging arrangement.
Figure 2:
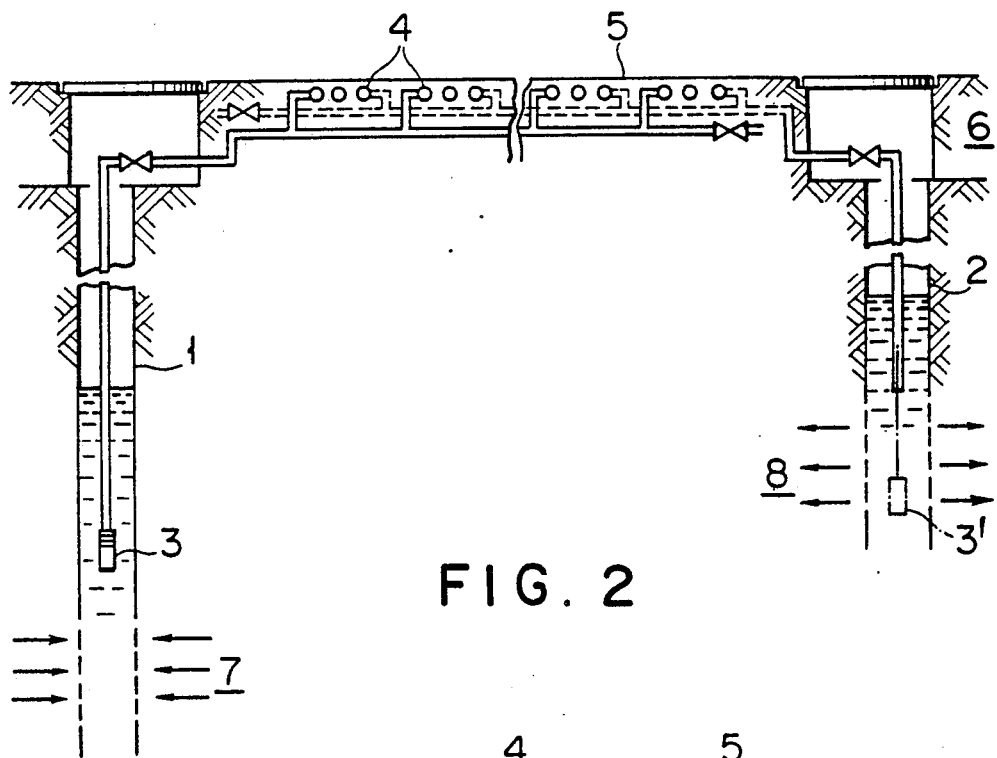
FIG. 2 shows a schematic sectional elevation of the arrangement shown in FIG. 1.
Figure 3:
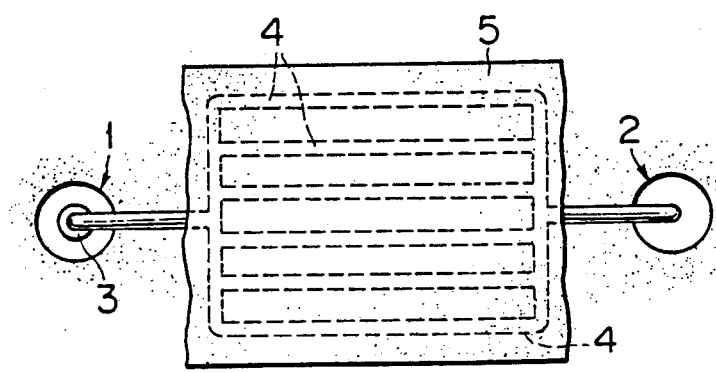
FIG. 3 is a view showing a modified example of FIG. 1.
Figure 4:
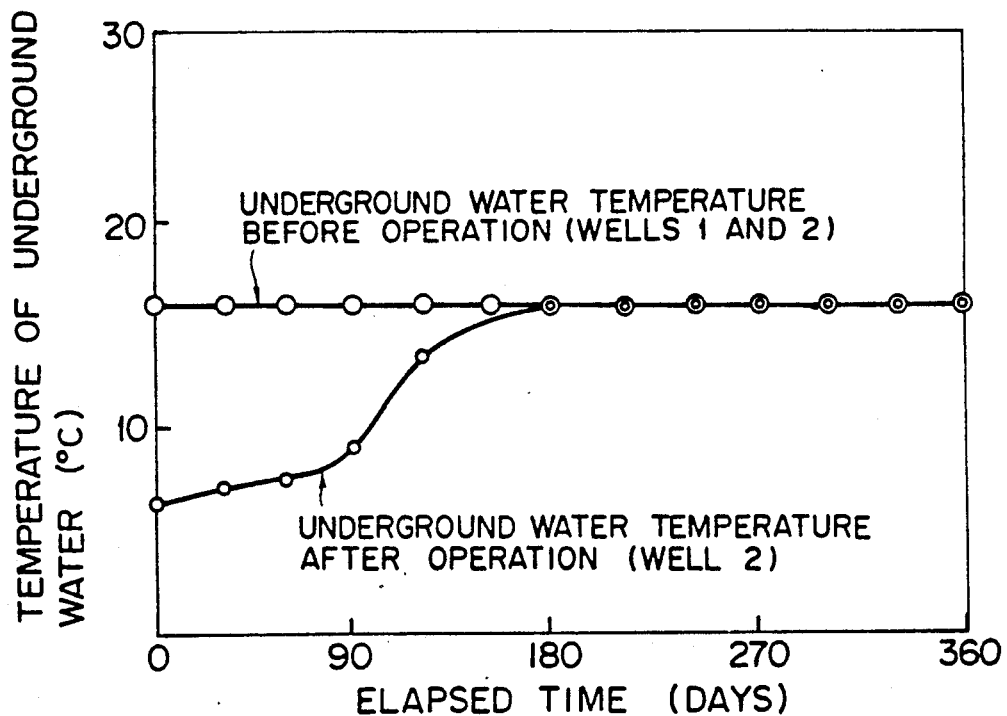
FIG. 4 is a graph representing underground water temperature with elapsed time with respect to one heat exchanging process.

FIGS. 1 and 2 represent a case in which heat exchanging is used for melting and removing snow lying on a road. Referring to these figures, at least two artesian wells 1 and 2 are formed, and a heat discharging and heat collecting pipe (or pipes) 4 is laid under substantially the entire surface of the road 5 in a meandering, bent, parallel (as shown in FIG. 3), spiral, zigzag, or the like form. The depth of the well 2 is at least two-thirds of that of the well 1. The distance between the wells 1 and 2 is from 30 to 150 meters. The pipe 4 can of course be arranged in another place, such as in a building structure or under a bed of a railway, suitable for melting the snow. The ends of the pipe 4 are respectively connected to the wells 1 and 2 through conduits, for example. According to this construction or combination of the wells and the pipe arrangement, the underground water in an aquifer 7 located beneath the ground surface about 50~200 meters therebelow can be pumped up by the operation of a pump 3 from the well 1, the underground water in the aquifer 7 being maintained at about 15°~18° C. even in a cold season as shown in FIG. 4. Accordingly, in the cold season, by causing the thus pumped up warm underground water to flow through the pipe 4 laid under the road 5 or in a building structure preferably at a speed of 0.3~1.5 meter/sec, the heat of the underground water is stored in the road and then transferred to the road, whereby the snow which has fallen on the road 5 or the building structure can be gradually melted, and hence, the freezing of the road surface can also be prevented by the heat transferred from the pipe 4.

The underground water thus used for warming the pipe 4, generally having a temperature of from about 7° to 8° C., is then returned through a conduit to the other well 2 and stored in the deep portion of the ground, thus forming a cold water zone 8. In this manner, the used water is again returned or recovered to the aquifer 7 from the ground surface 6 to reuse the same without being exposed to the atmosphere, thus preventing the underground water from being wasted and contaminated.

As shown in the graph of FIG. 4, the underground water after being used and returned in the aquifer 7 in the well 2 is gradually warmed as time elapses, and in about 6 months the temperature of the once used underground water is raised again to the normal temperature of the underground water of about 15°~18° C. which is stored under a thermally insulated condition for the use in the next cold snow season.

As described above, the snow which has fallen on the road or building structure can be effectively melted and removed without sprinkling water thereon and without using a great amount of the underground water.

Figure 5:
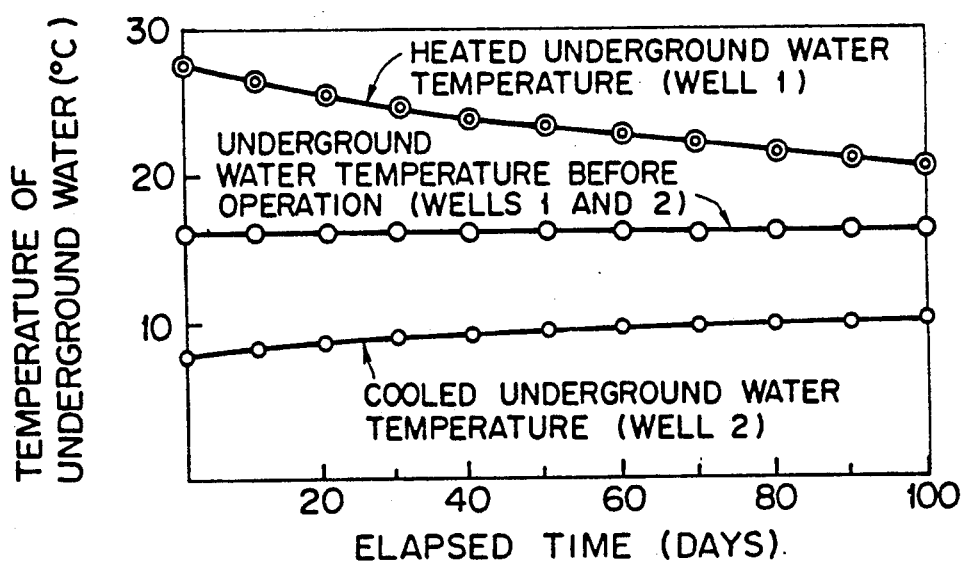
FIG. 5 is a graph representing heated and cooled underground water temperatures with elapsed time with respect to another heat exchanging process.

In a different use of the described arrangement, see, also, FIG. 5, hot or warm water heated to a temperature above 25° C. by solar heat in the heat or hot season and stored in the well 1 formed in the aquifer 7 laid in the deep portion under the ground surface of about 50~200 meters is utilized in the cold snow season by pumping up the stored water and circulating the same through the pipe arrangement 4 disposed beneath the road 5 in the manner described in detail hereunder.

The water heated by the solar heat in the hot season and stored in the aquifer 7 is maintained at a temperature of about 23°~25° C., in the cold snow season which is considerably higher than the temperature of about 15°~18° C., the normal temperature of the ground water due to the heat retaining function of the aquifer 7.

According to this different use, the thus heated and stored water is pumped up by the pump 3 from the well 1 and circulated through the heat discharging and heat collecting pipe(s) 4 laid under the road 5 thereby to melt and remove the snow which has fallen on the road 5, building structure or the like, thus preventing the snow or melted water from freezing on the road or the like. The water, after being used for melting the snow, has generally a temperature of about 7° C. and is retained into the cold water zone 8 in the other well 2 as a cooled water.

The water returned in the well 2 is utilized in the next hot season in the following manner. The returned water, having a temperature of about 7°~10° C. in summer season, which is lower than the normal underground water temperature of about 15°~18° C., is pumped up by the operation of a pump 3', shown by imaginary lines in FIG. 2 and, after being used for cooling houses, is circulated through the pipe 4 thereby to cool the road 5, building structure or the like and to prevent the pavement of the road from softening in the hot season. The cool water from the well 2 is heated through the heat transfer from the heated road and building structure during the circulation through the pipe 4, and the thus heated water, having a temperature of about 28° C. is returned to the well 1 into the deep aquifer 7 without being exposed to the atmosphere. The heated water thus returned in the well 1 forms a warm water zone in the aquifer 7 considerably below the ground surface zone 6 and is stored there as a heated water for melting the snow on the road or building structure in the next cold snow season in the manner described hereinbefore.

According to this use, the underground water used for melting the snow on the road or the like in the cold snow season can be effectively reused for cooling the road, building structure or the like in the hot season without being exposed to the atmosphere, so that the ground water as a water source can be kept without being wasted and contaminated.

In a different arrangement, described with reference to FIG. 6, the underground water in the well 1 pumped up by the operation of the pump 3 flows into the other well 2 through a conduit passing through a heat exchanger 10. The pipe 4 laid under the pavement surface of the road 5 is filled with an antifreezing liquid, which is circulated in the pipe 4 by the actuation of a pump 9 incorporated in a conduit connecting both ends of the pipe 4. According to this arrangement, the heat of the underground water is transferred to the antifreezing liquid when the underground water passes through the heat exchanger 10, and the heat transferred to the antifreezing liquid is in turn transferred to the road 5 and is stored in the road 5 when the antifreezing liquid circulates through the pipe 4 thereby to melt the snow lying on the road 5. A heat pump may preferably be used as a heat exchanger 10.

In this arrangement, the underground water warmed by the solar heat in the hot season is stored in the well 1 and the cold underground water, after the heat transfer in the heat exchanger 10, is stored in the well 2.

Because the antifreezing liquid is filled in the pipe 4, an accidental breaking of the pipe 4, which may be caused by the freezing of the water in the pipe 4 after stopping the operation of the pump 9, can be effectively prevented.

Figure 7:
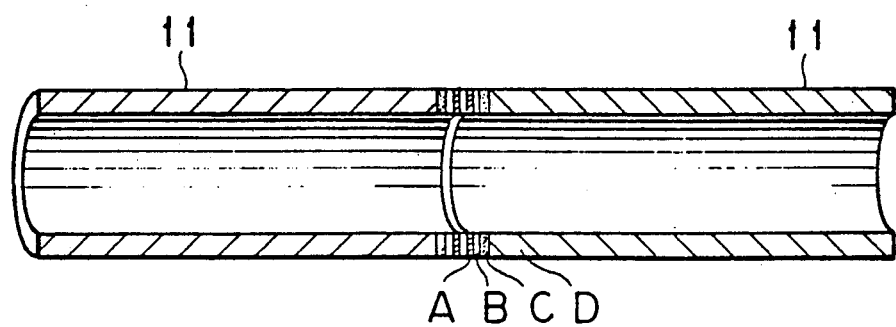
FIG. 7 shows a longitudinal section of a welded portion of pipe sections constituting a pipe to be used preferably for the embodiments of this invention.

In the aforementioned arrangement, the heat discharging and collecting pipe 4 is arranged under the road surface 5 so as to warm or cool the road surface substantially entirely, and a pipe having the following characteristics or structures is preferably used. These characteristics and structures will be described hereunder with reference to FIG. 7.

A pipe used in this invention as the pipe 4 has a chemical composition prescribed by the Japanese Industrial Standards (JIS) G-3452 and is usually composed of a plurality of pipe sections. An end face of one pipe section is abutted against an end face of another pipe section. The abutted portion is welded by means of throttled high energy beams such as Tig welding, and the thus welded portion is quenched rapidly by flowing argon gas through nozzle means thereby to form a welded joint, thus forming a heat discharging and collecting pipe.

As described above, the throttled high energy beam is irradiated to the abutting portions of the pipe sections to form a welded joint, and the cooling gas is then blowed to the welded portion to rapidly quench the same.

The thus formed heat discharging and collecting pipe has a martensitic structure, a mixed structure of the martensite and fine pearlite, and the fine pearlite structure from the welded portion towards the base material of the pipe in this order. No protruded or other deformed portion was observed in the welded portion of the thus formed pipe, and hence, the smooth welded surface is obtained. In a strength test of ten pipes thus formed, carried out by bending the respective one by about 90°, no break or crack was observed.

Figure 6:
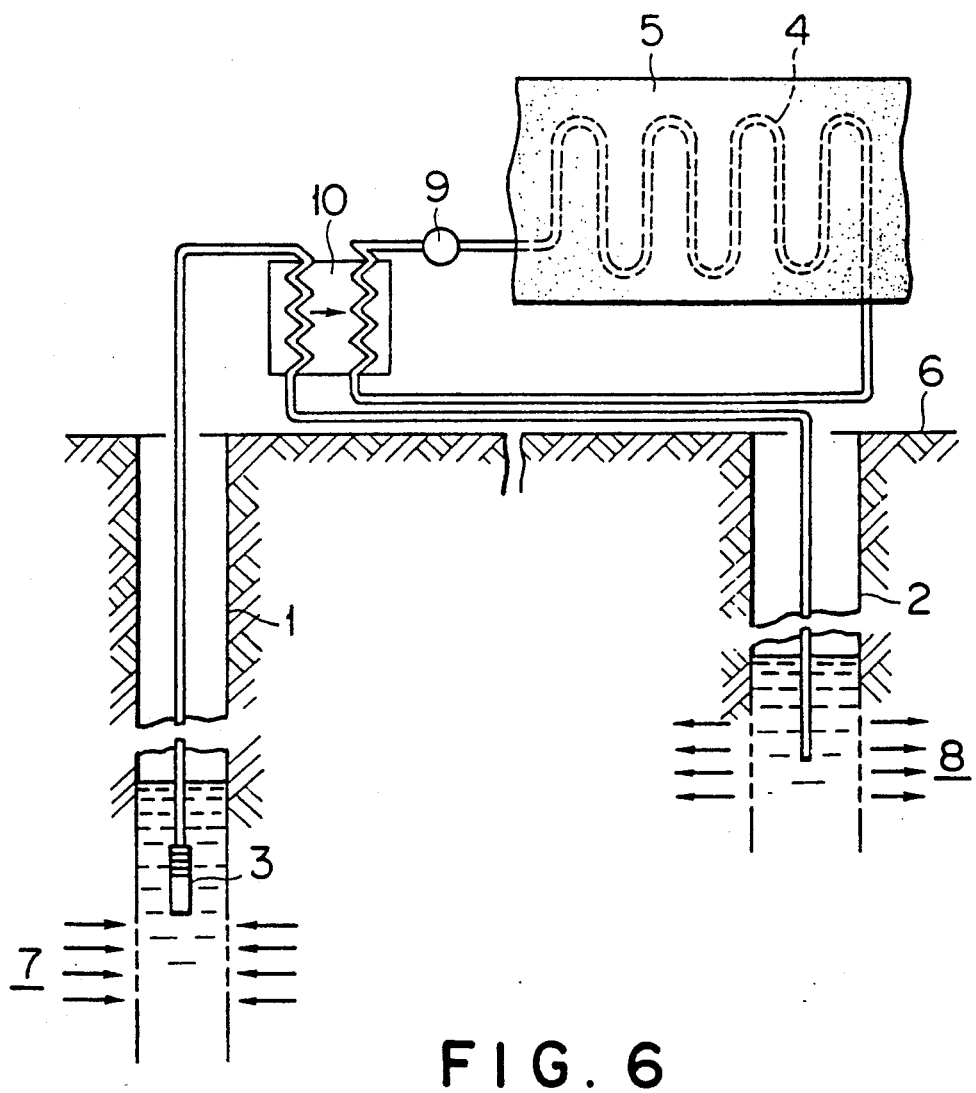
FIG. 6 is a schematic view, partially in section, explanatory of still another heat exchanging arrangement.

In the heat collecting pipe or pipes 4 shown in FIGS. 1, 3 and 6, water or antifreezing liquid flows in one direction for melting snow. For example, in FIG. 3, warm underground water is pumped up and caused to flow in the pipes 4 in the same direction from the well 1 to the well 2. When warm water flows as above, the warm water is cooled as it flows toward the well 2 so that the temperature of the surface of the road 5 becomes lower as it extends from the left to the right as viewed in FIG. 3. This means that the temperature of the road surface is not uniform so that snow lying on the road 5 toward the well 1 is melted while snow lying on the road 5 toward the well 2 is partly or not fully melted. This is dangerous for vehicles travelling on the road.

Figure 8:
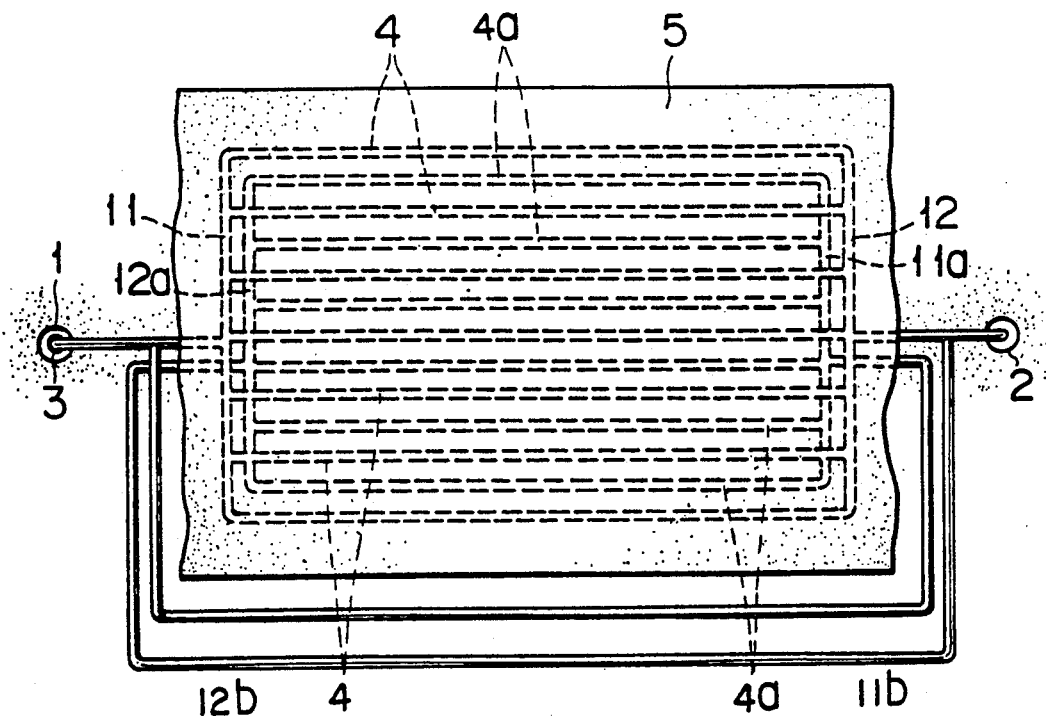
FIG. 8 shows a plan view of a heat exchanging pipe system according to this invention.

FIG. 8 shows an example of the heat collecting and discharging pipe system 4 embedded in a road 5. The chemical composition of the pipes 4 is that prescribed by the Japanese Industrial Standards (JIS) G-3452, for example. The length of each straight pipe is approximately 100 meters.

As shown, underground water pumped up from the well 1 by the pump 3 is supplied into a first feed header 11 extending transversely to the long straight pipes 4 disposed parallel to each other. The lefthand ends (as viewed) or first ends of the pipes 4 are communicatively connected to the first feed header 11. The righthand or second ends of the parallel pipes 4 are connected to a first return header 12 extending transversely to the pipes 4. The return header 12 communicates with the well 2 as shown.

A second feed header 11a is disposed in substantially parallel, adjoining relation with the first return header 12. The second feed header 11a is communicatively connected to the pump 3 in the well 1 through a connecting pipe 11b. Another set of second parallel pipes 4a are laid under the road 5 in parallel disposition to the first parallel pipes 4. The pipes 4a are substantially coextensive with the pipes 4. The pipes 4a have righthand or first ends communicatively connected to the second feed header 11a. The other or second ends of the pipes 4a are communicatively connected to a second return header 12a extending in substantially parallel, adjoining relation with the first supply header 11. The second return header 12a is communicatively connected to the well 2 through a connecting pipe 12b.

It will be understood from the foregoing that when the pump 3 is operated, underground water in the well 1 will flow into both the first and second supply headers 11 and 11a and will then flow through the parallel straight pipes 4 and 4a in counterflow in adjoining pipes because the pipes 4 and 4a are disposed alternately as shown. For this reason, gradually decreasing temperature of the pipes 4 toward the downstream side (righthand side) thereof is compensated for by gradually decreasing temperature of the pipes 4a toward the downstream side (lefthand side) thereof, whereby a substantially uniform temperature distribution is obtained throughout the road surface.

The above stated structure may also be applied to parking places, runways for aircrafts, tennis courts, running tracks, platforms, wharfs and so on. It is to be noted that the pipes 4 and 4a need not be straight but may be curved in parallel relation.

What is claimed is:

1. A heat collecting and discharging pipe system embedded in a structure on the ground, comprising:
    a first feed header extending in a first direction and communicatively connected to a source of supply of a liquid to undergo heat collection and discharge in the system;
    a first set of parallel pipes communicatively connected at first ends thereof to the first feed header and extending in a second direction transverse to said first direction to terminate in second ends;
    a first return header extending in opposed parallel relation to said first feed header and communicatively connected to said second ends of the first set of parallel pipes, said first return header being communicatively connected to a return source of the liquid;
    a second feed header extending in substantially parallel, adjoining relation with said first return header and communicatively connected to said source of supply;
    a second set of parallel pipes communicatively connected at first ends thereof to the second feed header and extending in the second direction to terminate in second ends, the second set of parallel pipes being substantially coextensive with the first set of parallel pipes; and
    a second return header extending in substantially parallel, adjoining relation with said first supply header and communicatively connected to said second ends of the second set of pipes, said second return header being communicatively connected to said return source, said pipes of the first set and the pipes of the second set being in alternatively disposed, parallel arrangement.

2. The heat collecting and discharging pipe system according to claim 1, wherein said first and second sets of pipes are each arranged to lie in a horizontal plane.

* * * * *